United States Patent [19]
Schwartz et al.

[11] Patent Number: 5,184,246
[45] Date of Patent: Feb. 2, 1993

[54] SCANNING OF MOVING OBJECTS USING UNIQUE POLYGON MOUNTED ON CAROUSEL WHICH ROTATES AT TWICE POLYGON'S SPEED

[76] Inventors: Nira Schwartz; Arie Shahar, both of 2800 Plaza Del Amo, Unit 187, Torrance, Calif. 90503

[21] Appl. No.: 660,542

[22] Filed: Feb. 25, 1991

[51] Int. Cl.[5] .......................................... G02B 26/10
[52] U.S. Cl. .................................. 359/216; 250/236; 359/196; 359/218
[58] Field of Search ................... 250/347, 236, 235; 359/216, 217, 218, 219, 212, 196, 203, 221, 223, 225, 226

[56] References Cited

U.S. PATENT DOCUMENTS

| | | | |
|---|---|---|---|
| 4,084,092 | 4/1978 | Runciman | 250/347 |
| 4,509,819 | 4/1985 | Sherman et al. | 359/221 X |
| 4,624,528 | 11/1986 | Brueggemann | 359/216 |
| 4,733,072 | 3/1988 | Lettington | 258/235 |
| 4,766,308 | 8/1988 | Karlsson | 250/236 |
| 5,044,710 | 9/1991 | Iwai et al. | 359/217 |

Primary Examiner—Constantine Hannaher
Assistant Examiner—Edward J. Glick
Attorney, Agent, or Firm—David Pressman

[57] ABSTRACT

A polygon for reading and writing information, and for tracking industrial products on a rotating carousel is arranged so that each of its sides behaves effectively like a mirror mounted directly on a rotational axis of the polygon. When this polygon is installed in the center of rotating carousel, it can perform accurate tracking of objects on the carousel with a constant (fixed) rotational speed equal to half of the rotational speed of the carousel. One design employs a polygon with side mirrors tilted in an arbitrary angle with surrounding mirrors (opposite-side mirrors) tilted at a right angle with respect to the tilted side mirrors of the polygon (FIG. 12). Additional designs are of polygons with side mirrors tilted at an arbitrary angle $\alpha$ and opposite-side mirrors tilted at an angle $\alpha/n$ (where n is an integer) with respect to the tilted side mirrors of the polygon. Such a polygon is illustrated in FIG. 11 for n=1 ($\alpha=\beta=45$ degrees). All the planes of the side mirrors and the surrounding mirrors (opposite-side mirrors) have a common intersection located on the polygon's axis as shown (FIGS. 5, 6, and 11). The design of these polygons eliminates all the unwanted effects of off-axis side mirrors which exist in standard polygons. This is done by producing an optical path that is equivalent to the optical path of scanning mirrors so that their plane contains the rotational axis of the system (mounted directly on the rotational axis-FIG. 2).

25 Claims, 13 Drawing Sheets

SCANNING OF MOVING OBJECTS USING UNIQUE POLYGON MOUNTED ON CAROUSEL WHICH ROTATES AT TWICE POLYGON'S SPEED

BACKGROUND

1. FIELD OF THE INVENTION

This invention relates generally to the field of optics and in particular to optical polygons which are used to manipulate light beams for reading, writing, and inspecting various surfaces.

2. Prior Art—FIGS. 1 to 4

A wide variety of optical systems for scanning surfaces with light beams are known in the art. Some of these systems employ flat mirrors and others employ polygonal mirrors. Many of these systems are reading (or inspection) machines; such machines usually have a camera in a fixed position and the information (the image) is transferred to the camera from different locations by a scanning mirror. Others of these systems are writing (printing) machines; these have a similar design where a laser is mounted in a fixed position and a writing beam from the laser shines upon a scanning mirror which causes it to scan across a surface.

FIG. 1: Basic Optics—Prior Art

An example of a basic optical system which will aid in understanding such scanning systems is shown in FIGS. 1-4. A planar mirror S1 is mounted so that its reflecting surface faces upward, in the illustrated embodiment. An incident beam A2 from a laser or other source travels at an angle T to a normal N1 perpendicular to mirror S1. Angle T is equal to angle Q between the normal and a reflected beam A3. Beam A3 is sent to a reading means or writing surface (not shown). An angle P between incident beam A2 and reflected beam A3 is equal to $2 \times T$, i.e., twice the incident or reflected angle.

FIG. 2: Rotating Optics—Prior Art

Assume mirror S1 is made to scan around a circle by mounting it directly upon a rotating axis X1 (FIG. 2) which rotates with an angular velocity. Then, so long as incident beam A2 can reach the mirror, reflected beam A3 has an angular velocity $2 \times \Omega$. This can be shown by rotating mirror S1 counterclockwise to a new position A6 through an angle S, resulting in an angle $Z = 2 \times S$ between the new position A7 of the reflected beam and the old position A3 thereof. (Normal N1 is a perpendicular to the initial position of mirror S1 and normal N2 is a perpendicular to new mirror position A6). The result is a linear relationship between rotated angle S of the mirror and the angle between incident beam A2 and reflected beam A7.

FIG. 3: Scanning By Mirror—Prior Art

One of the most needed applications in industry is a way to track industrial products located on a rotating carousel. The scanning system of FIG. 2 is used for this purpose as follows: Assume that carousel C2 (FIG. 3) is rotated with an angular velocity $\Omega_c$ about an axis X2. A group of glass or plastic bottles initially centered respectively at points B12 to B17 is mounted on carousel C2. The bottles are to be inspected for flaws in the glass using a laser scanning beam.

To scan the bottles, a laser source L emits an incident beam A2 which is reflected as tracking beam A3 from mirror S1. The beam hits a point B12 at which a bottle is mounted. Mirror S1 tracks the bottle from starting point B12 to a new position B13. This occurs while the carousel and the bottles on it are moving at an angular velocity $\Omega_c$ through the desired tracked interval around the circle.

All this occurs while a special mechanism rotates the mirror with an angular velocity $\Omega_m = \Omega_c/2$ through angle U of the circle, i.e., the mirror is moved from initial position P1 to new position P2. At that point a special mechanism returns the mirror quickly (with an angular velocity much higher than $\Omega_m$) to its initial position P1 in order to scan and track the next bottle on the carousel.

A new cycle of tracking starts with a different bottle at position B12. The bottle was initially located at position B17, which has since rotated to new position B12. Incident tracking beam A2 is reflected as beam A3 from mirror S1 which is at position P1, toward the new bottle at position B12.

The whole procedure of tracking demands a back-and-forth rotation or oscillation of the mirror from position P1 to position P2 at an angular velocity $\Omega_m$ and then back from P2 to P1 at an angular velocity much higher than $\Omega_m$. This back-and-forth motion creates vibrations, resulting in optical distortions. The back-and-forth movement also creates accelerations that cause deviations from the following linear relationship:

$$\text{Mirror's rotational speed} = \tfrac{1}{2} \text{ Carousel's rotational speed}$$

The cycle time required to return the scanning mirror to its initial position P1 reduces the length of tracking interval that can be scanned. Also, in many structures, the center of the carousel has an axle with a large radius which does not allow the scanning mirror to be mounted at the center of the carousel. Tracking the product on the carousel with the scanning mirror mounted off center requires a non-linear relationship between the rotational speed of the carousel and the rotational speed of the scanning mirror. Theoretically such tracking can be done by computerizing the scan system, but in reality this technique fails because the motor that drives the mirror can not respond fast enough to positioning commands from a computer.

FIG. 4: Rotating Polygon—Prior Art

The oscillating planar mirror of FIG. 3 can be replaced by a continuously rotating polygonal mirror M1 (FIG. 4). The sides of the polygon are plane mirrors. The scanning range of the polygon is determined by the symmetrical rotation angle V which is the angle needed to bring the polygon back to its initial position. V is determined in accordance with the formula:

$$V = (360 \text{ degrees/number of sides of the polygon})$$

This system is compounded because a superposition of two movements is involved: one is the carousel rotating around its axis and the second is a spin movement of the bottles around their own axes (not shown). Proper tracking enables reading or writing around the product's spinning surface while the products are simultaneously moving on the carousel.

To periodically track a plurality of N items distributed uniformly on a carousel, there should be an arc or tracking angle between each adjacent pair of products. In that case the tracking angle along the carousel arc is:

Tracking angle = 360 degrees/$N$

The rotational angle of the polygon should be half tracking angle along the carousel, resulting in the following:

Nr. of polygon sides = 2 × number of items on the carousel

The side mirrors of the polygon are spaced away from the carousel's axis (off-axis). That causes a difference in the optical path lengths of the incident and reflected beams for the two following positions of the polygon:

The first polygon position is shown in solid lines and the optical path length of the incident and reflected beams is $L1-Y1-L2$.

The second polygon position is shown in broken lines and the optical path length for the incident and reflected beams is $L1-Y2-L3$.

The difference between the two optical path lengths is clear. Using simple mathematics it is also clear that the difference in the two optical paths increases with increases in the polygon's radius r. This difference in the two optical paths is known as a pupil shift and is known to result in bowed distortions at a camera D or other light receptor.

Since polygons are very convenient for scanning purposes, many techniques have been developed to overcome their limitations. Here the off-axis mirrors of the polygon shift the corner of the scanning angle out of the carousel's center. This shift is coupled with an additional pupil shift, thereby destroying or deviating from the linear relationship between the position angle of the rotating carousel and the rotational angle of the polygon.

This deviation effectively increases with the polygon's radius. The deviation approaches zero when the polygon's radius approaches zero (If the polygon could have a radius of zero, it would be, in effect, a mirror mounted directly on the rotational axis.)

Some techniques for overcoming the problem of non-linear relationships use small-radii polygons and/or optical pixel computer correction lookup tables. The use of only small-radii polygons limits scanning applications to scanning narrow stripes, like those scanned by line scan cameras, or to writing with narrow laser beams. However in many situations, high-speed scanning systems with large-radii polygons must be used for tracking large images or for writing with wide laser beams. For these applications, the side mirrors of the polygon should be very large, resulting in a large-radius polygon. When large-radius polygons are used, deviation of the scanning point from the correct position is large and position corrections must be performed by a computer.

However the requirement for high speed does not leave enough time for both processing the image and correcting the beam's position using computer lookup tables. In addition to these problems, large-radii polygons have a large mass that makes the response of the scanning system too slow to respond to computer commands at the required speed of the system.

OBJECTS AND ADVANTAGES

Accordingly, several objects of the invention are to provide scan systems that are more accurate, simple to activate, free of physical dimensional limitations, free of real-time correction iterations, and very easy to build.

Another object is to provide polygon scan mirrors whose side mirrors behave effectively like mirrors mounted directly on the rotational axis and that are insensitive to pupil shift.

Another object is to provide accurate tracking systems for writing, reading, and inspection machines based on rotating carousels, especially using polygons that rotate with a fixed speed that is half of the rotational speed of the carousel.

Other objects include providing polygons that can exhibit a non-bowed scan-line for scanning and tracking products on rotating carousels, to provide polygons with large side mirrors that rotate at a fixed velocity for accurate tracking of products on rotating carousels using linear scanning or area-scanning cameras, to provide polygons with large side mirrors that rotate with fixed velocities for accurate writing on products located on rotating carousels, to provide such polygons for use with narrow or wide laser beams so as to provide large or small mirror systems mounted on all or part of the space determined by the polygon, to provide such a system that rotates with a fixed velocity for accurate reading of products located on a rotating carousel using a linear or a matrix camera, and to provide polygons with large side mirrors for accurate writing and reading without blocking the field of view during the scan.

Still further objects and advantages will become apparent from a consideration of the ensuing description and accompanying drawings.

SUMMARY

These and other objects are accomplished by using polygons with tilted side mirrors which are each positioned at an angle $\alpha$ with respect to the polygon's axis, and opposite-side surrounding mirrors positioned at an angle $\alpha/n$ (where n is an integer) with respect to the polygon's tilted side mirrors. The tilted side mirrors are positioned at arbitrary angles and the opposite-side surrounding mirrors are positioned at a right angle with respect to the tilted side mirrors. The number of outside mirrors is equal to the number of the polygon's sides. All the planes of the polygon's mirrors and the surrounding outside mirrors have a common intersection point, located on the polygon's axis. Polygons with this special design, unlike conventional polygons, are insensitive to unwanted effects of polygons with off-axis mirrors. Particular cases which are very useful are where $\alpha=\beta=0$ degrees, $\alpha=\beta=45$ degrees, and $\alpha=45$ degrees and $\beta=90$ degrees.

The present scanning system overcomes the problems caused by the off-axis mirrors of conventional polygons (pupil shift and bowed scan lines) by using a polygon where each side mirror behaves effectively like a mirror that is mounted directly on the rotating axis. The scanning system is capable of tracking the spinning axis of the products (or any other fixed point) on the rotating carousel. This tracking can be done by polygons with arbitrary radii, without bowed scan lines (even when the incident beam and the reflected beam are out of the rotation plane, determined as a plane that is perpendicular to the rotational axis of the polygon), and without any correction for the scan position. This enables an accurate scan with large polygons using a fixed rotational speed (half the rotational speed of the carousel) and enables the use of scanning large images or writing with wide laser beams.

DRAWING FIGURES

Reference Numbers

A1 plane mirror
A2 incident beam
A3, A7 reflected beam
N1, N2 perpendiculars to plane mirror A1
B12-B17 bottle's positions
M1 polygon
C2 carousel
F15-F20 polygon facets
O object
312-317 side mirrors
318-323 opposite-side mirrors
23-29 imaginary plans
340 incident beam
350 reflected beam
23-38 imaginary images

Figure 1:
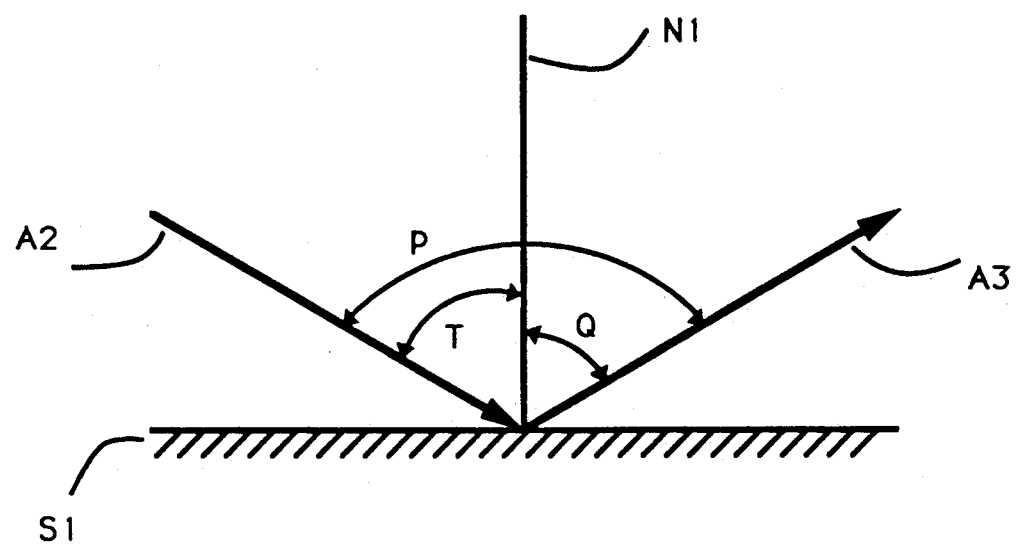
FIG. 1 is a prior-art diagram showing the basic angles of beam reflection.

FIG. 1—Prior Art—Basic Optical System

As previously discussed, FIG. 1 demonstrates one of the basic rules of optics for a reflecting surface S1. An incident beam A2 from a source light or laser beam traveling at an angle T is reflected at an angle Q. N1 is a perpendicular to reflecting surface S1. T is equal to Q.

Figure 2:
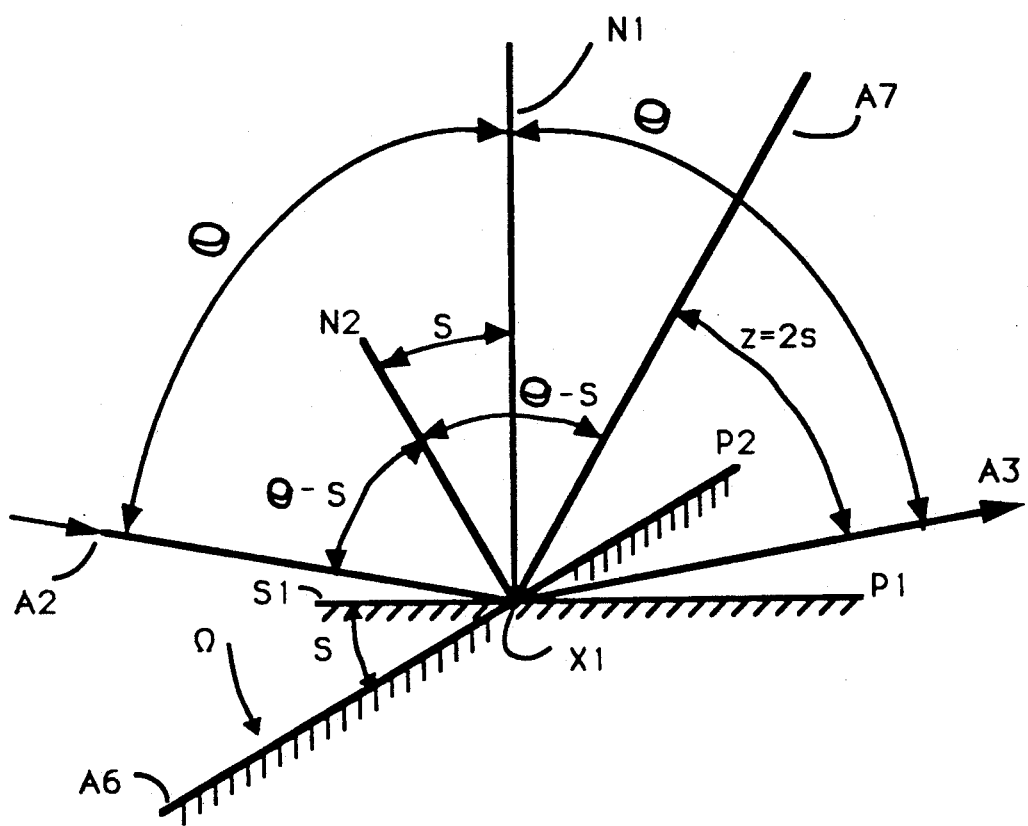
FIG. 2 is a prior-art diagram showing the effects of a moving mirror.

FIG. 2—Prior Art—Rotated System

FIG. 2 demonstrates the action of a reflecting surface S1, which is initially at position P1 and which rotates to a second position P2 about an axis X1. A2 is the incident beam, A3 is the reflected beam for the first position, and A7 is the reflected beam for the second position. Normal N1 is a perpendicular to mirror S1 at position P1 and normal N2 is a perpendicular to new mirror position P2. Angle S is between perpendiculars N1 and N2.

Figure 3:
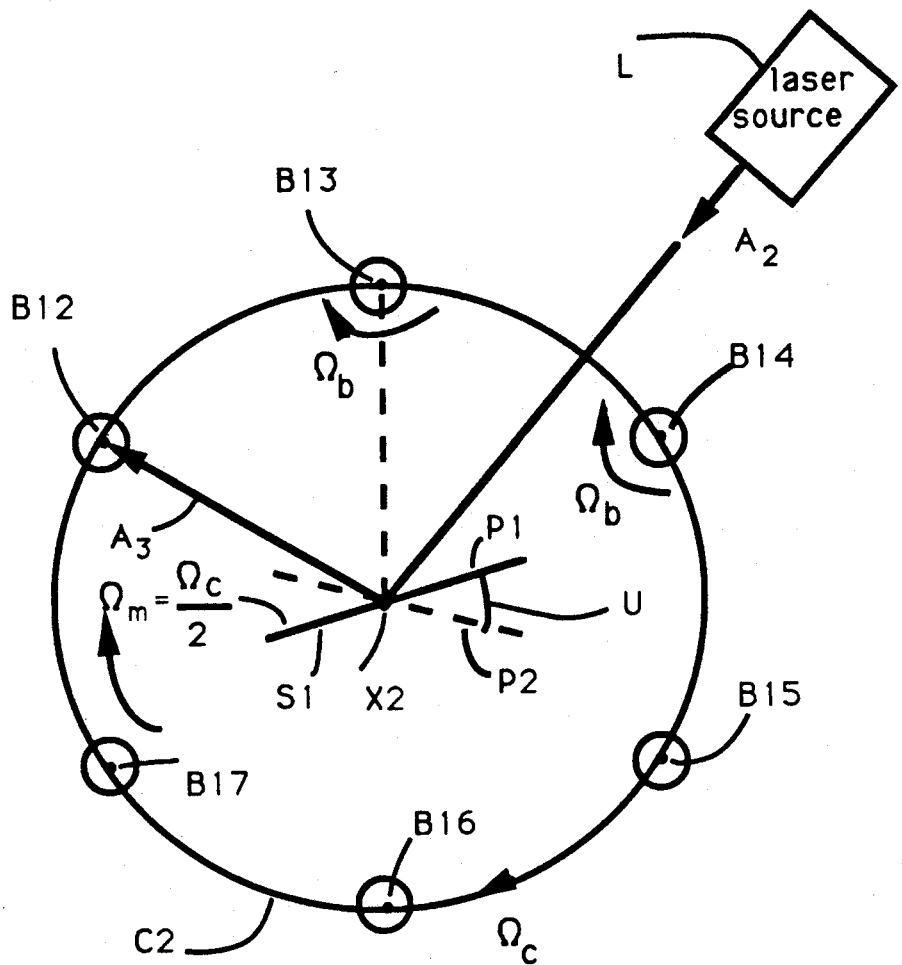
FIG. 3 is a prior-art diagram relating the moving mirror to scanned objects.

FIG. 3—Prior Art—Plane Mirror Tracking System

FIG. 3 illustrates motion of products centered initially at points B12-B17 on carousel C2. The products rotate on their own axes B12 to B17, and with an angular velocity $\Omega_b$. At the same time the carousel rotates with an angular velocity $\Omega_m$ about axis X2. Mirror S1 rotates through an angle U to position P2.

Figure 4:
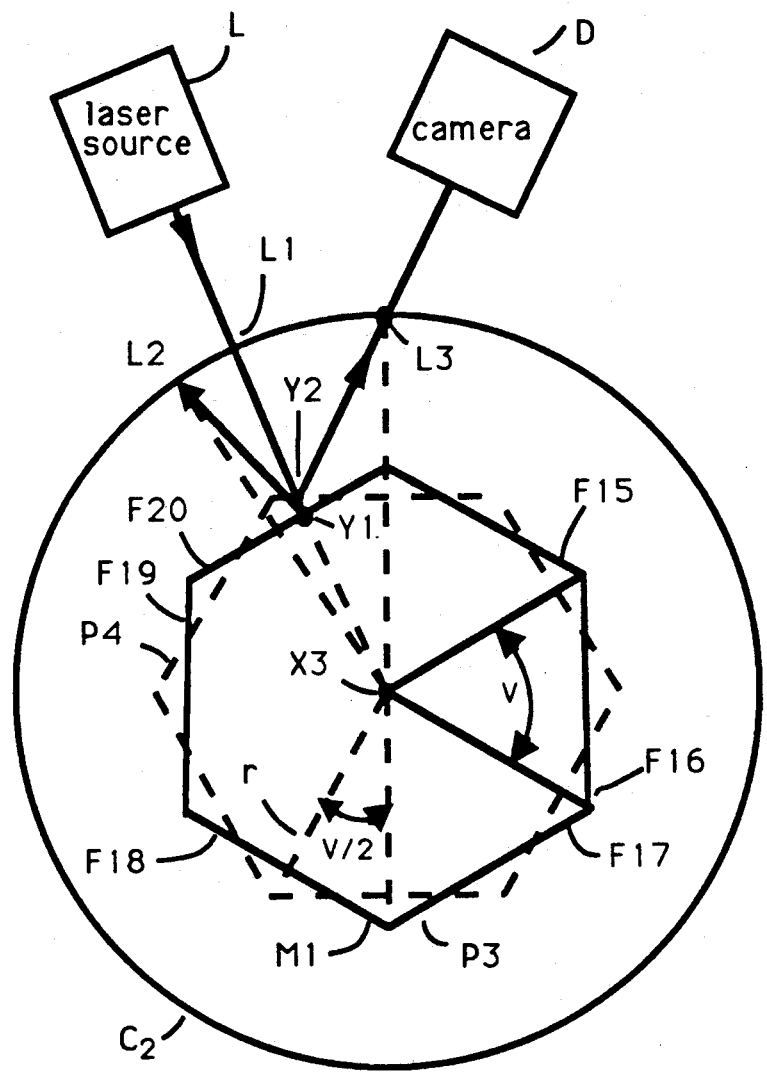
FIG. 4 is a prior-art diagram which depicts the principles of operation of multi-sided polygons.

FIG. 4—Prior Art—Polygon Tracking System

FIG. 4 shows a top view of a regular polygon with six facets F15 to F20. The polygon is rotated from a first position P3, shown in solid lines, to a second position P4, shown in broken lines. The polygon rotates on axis X3 of carousel C2. In the polygon's first position, a laser source L emits an incident beam L1 that hits the polygon at point Y1 and is reflected as a tracking beam L2. In the polygon's second position, incident beam L1 hits the polygon at point Y2 and is reflected path as beam L3. The polygon's two positions are separated by a rotational angle V/2. Reflected beams L2 and L3 can be collected by a camera D or by a sensor (not shown). The system is reversible, i.e., a light source can be mounted in place of the camera and the light can be collected at the laser's location by a camera. The two cases describe a write and a read situation, respectively. The write function can engrave a code on the surface of the object and the read function can collect an image of the object for analyzing defects.

Figure 5:
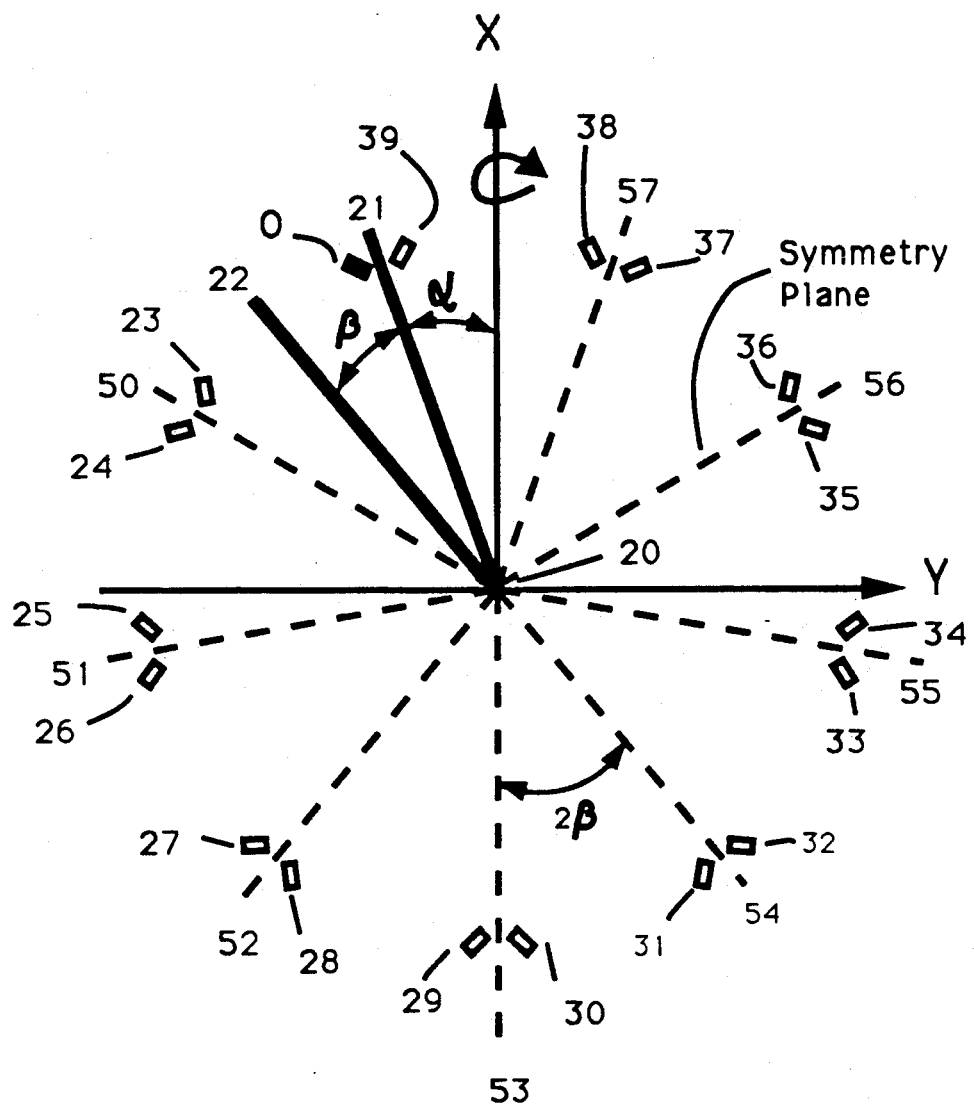
FIG. 5 is a diagram showing a side-view projection of an object and its images located around the imaginary planes generated by a two-mirror system.

FIG. 5—Mirror System—Top View

FIG. 5 is a top view of a mirror system and is provided as a preliminary aid to assist in understanding the invention.

The mirror system consists of two mirrors 21 and 22 whose reflecting surfaces face each other. Their planes intersect in a line 20 that is perpendicular to the plane of the paper. Ordinate X is the rotational axis of a polygon (not shown in FIG. 5) to be described. I.e., unlike FIG. 4, where the polygon's axis is perpendicular to the plane of the paper, in FIG. 5 the polygon rotates on an axis which is parallel to the plane of the paper.

Figure 12:
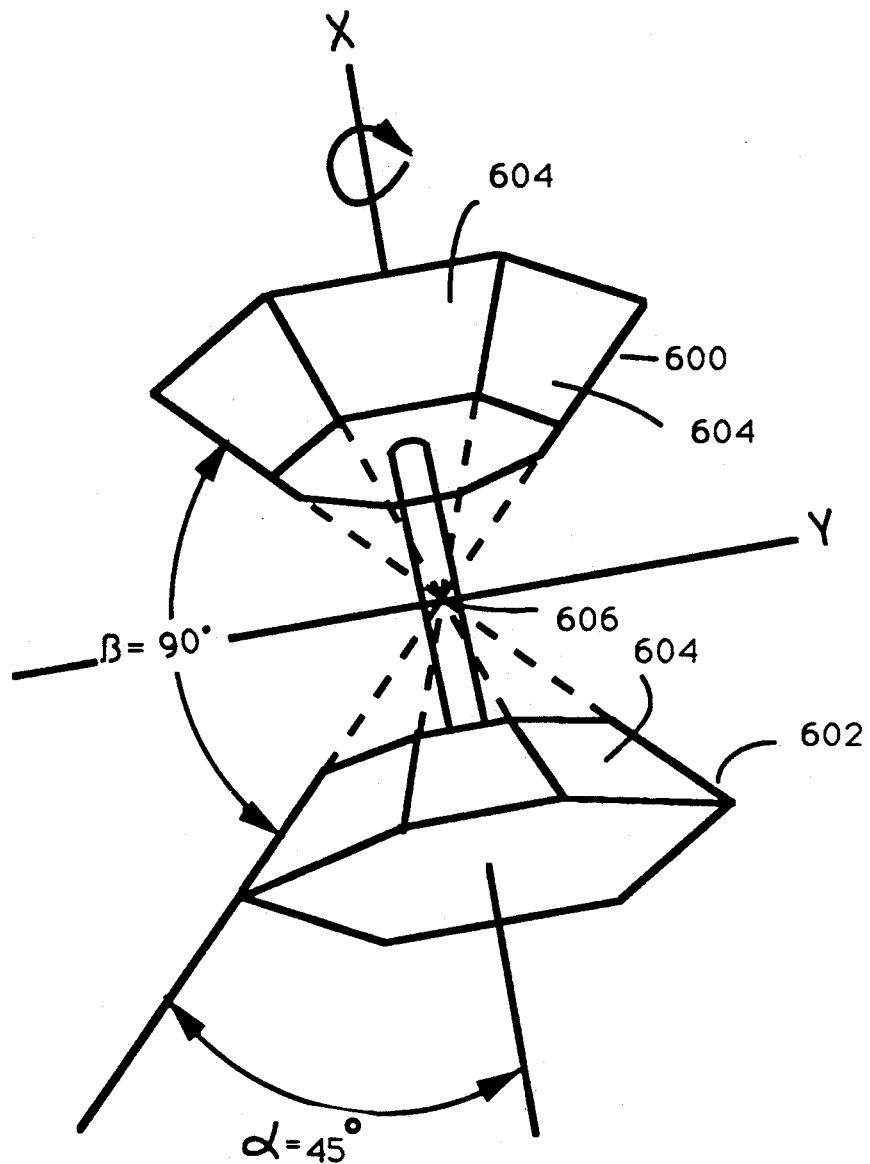
FIG. 12 is a perspective view of dual polygons produced according to the invention ($\alpha = 45$ degrees, $\beta = 90$ degrees).

According to the invention, each of the side mirrors of a conventional polygon (not shown)—i.e., each face of the polygon—is replaced by a pair of mirrors like those illustrated in FIG. 5. The result is shown in FIG. 12 which shows two polygons with sides or faces which are tilted toward their common axis of rotation. Each face of each polygon, such as 21, has a mating face, such as 22, in the other polygon. This same pair of mirrors are shown in FIG. 5, albeit at a smaller angle.

In the resultant mirror system, an object O (FIG. 5—shown as a shaded rectangle) is positioned between the mirrors. When the mirrors are oriented at the proper angles to rotational axis X, an observer or viewer will see a large number of imaginary images which are shown as unshaded rectangles, i.e., images 23 to 39. The location of one of the images, i.e., image 37, as seen by a viewer, has a symmetric location to object O with respect to the rotational axis X of the polygon. Image 37, with its special symmetry feature, is the only image out of the plurality of images 23 to 39 in which we are interested. Image 37 is in a unique position. This image at that unique position can be duplicated. Such duplication can done by replacing the pair of mirrors with one mirror that has a reflecting surface facing the object and rotates around ordinate X, i.e., ordinate X is the axis of rotation of the plane mirror.

For optical equivalency, i.e., for identical optical results, the two systems (the pair of mirrors on a polygon's facet and a plane mirror at the rotational axis) are identical.

Now each facet side of the polygon is replaced by a pair of mirrors, thereby creating a unique polygon. Each pair of mirrors has a unique image, such as image 37. Each pair of mirrors effectively behaves like a rotating plane mirror, whose plane contains ordinate X, which is the rotational axis of the polygon.

The result is that a continuous rotating movement of this polygon optically resembles continuously rotating plane mirrors, i.e., one plane mirror for each pair of mirrors defines a facet. This provides a desirable result, i.e., a system that uses a unique polygon continuously rotating so that its optical behavior is identical to a plane mirror located at the rotational axis of the carousel without the need to oscillate.

If we define mirror 21 of this system as a side mirror of a polygon and mirror 22 as an opposite-side mirror or secondary mirror, object O between the two mirrors generates several images according to a well-known principle.

The number of images is given by:

Nr. of images = Integer $(360/\beta) - 1$

The images are arranged in pairs (for example images 37 and 38) around imaginary planes 50 to 57. The angle between each adjacent pair of imaginary planes is twice as large as the angle between the mirrors.

The locations of the imaginary planes for each pair of images are schematically illustrated by broken lines 50 to 57. The angle between ordinate X and mirror 21 will be called $\alpha$ and the angle between mirrors 21 and 22 will be called $\beta$. At least one of the imaginary planes and the plane that includes the side mirror (21) should be symmetrical with respect to rotational axis X of the polygon. I.e., at least one of the images and the object are also symmetrical with respect to axis X.

Figure 6:
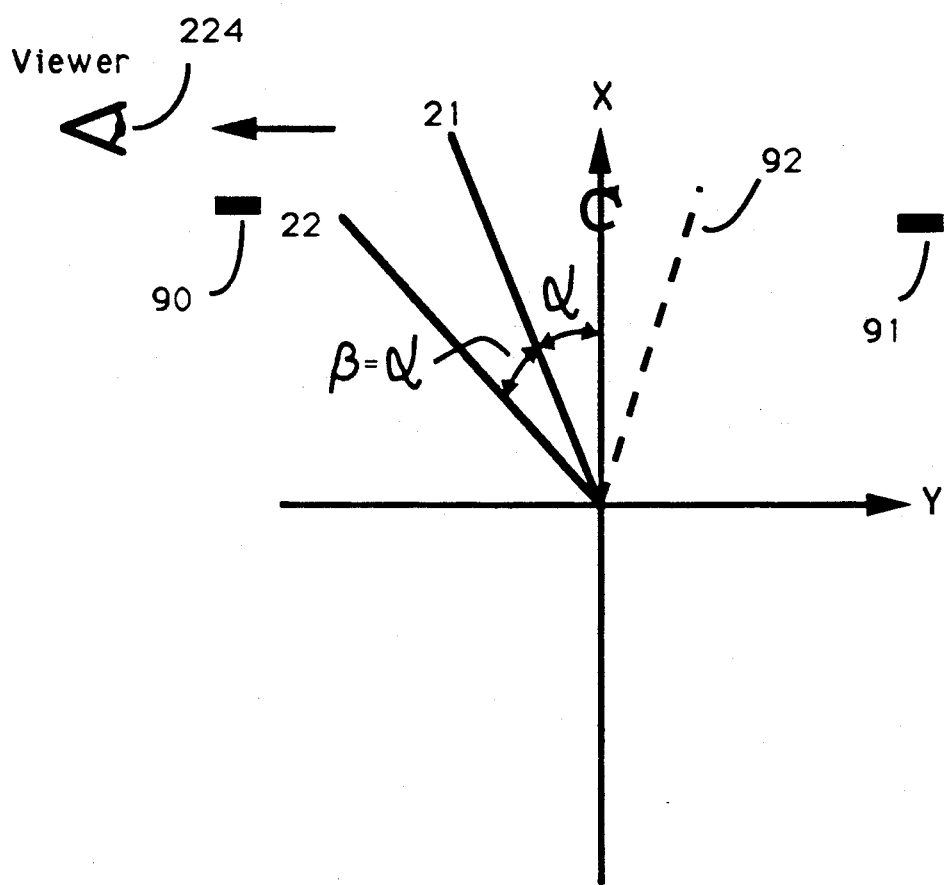
FIG. 6 is a diagram of a mirror system corresponding to FIG. 5 ($\alpha = \beta$) observed in the object plane.

FIG. 6—Mirrors Mounted at Arbitrary Angle

FIG. 6 shows a mirror system in which an object 90 and an image 91 are symmetric to axis X. The combination of side mirror 21 and opposite-side mirror 22 behaves effectively like one vertical mirror mounted directly on axis X. The location of the imaginary plane for image 91 is shown as dashed line 92.

This situation can be achieved for angles and that satisfy the relationships:

$2 \times n \times \beta = 2 \times \alpha$ or $\beta = \alpha/n$ \hfill (1)

where n is an integer (n = 1,2,3 ...)

The situation illustrated in FIG. 6 is for n = 1, i.e., $\alpha = \beta$. It can be seen that $\beta$ decreases as n increases, resulting in a limited field of view. When a linear scanning technique is used, there is a way to overcome the limitation of narrow field of view caused by a small $\beta$. This is to make mirror 22 in the shape of a narrow strip. Such a mirror will block the field of view only once during the scan and its disturbance is negligible. In situations where a strip mirror is used for mirror 22, n can even approach infinity. In this case $\beta$ equals zero and mirror 22 is parallel to mirror 21.

Figure 7:
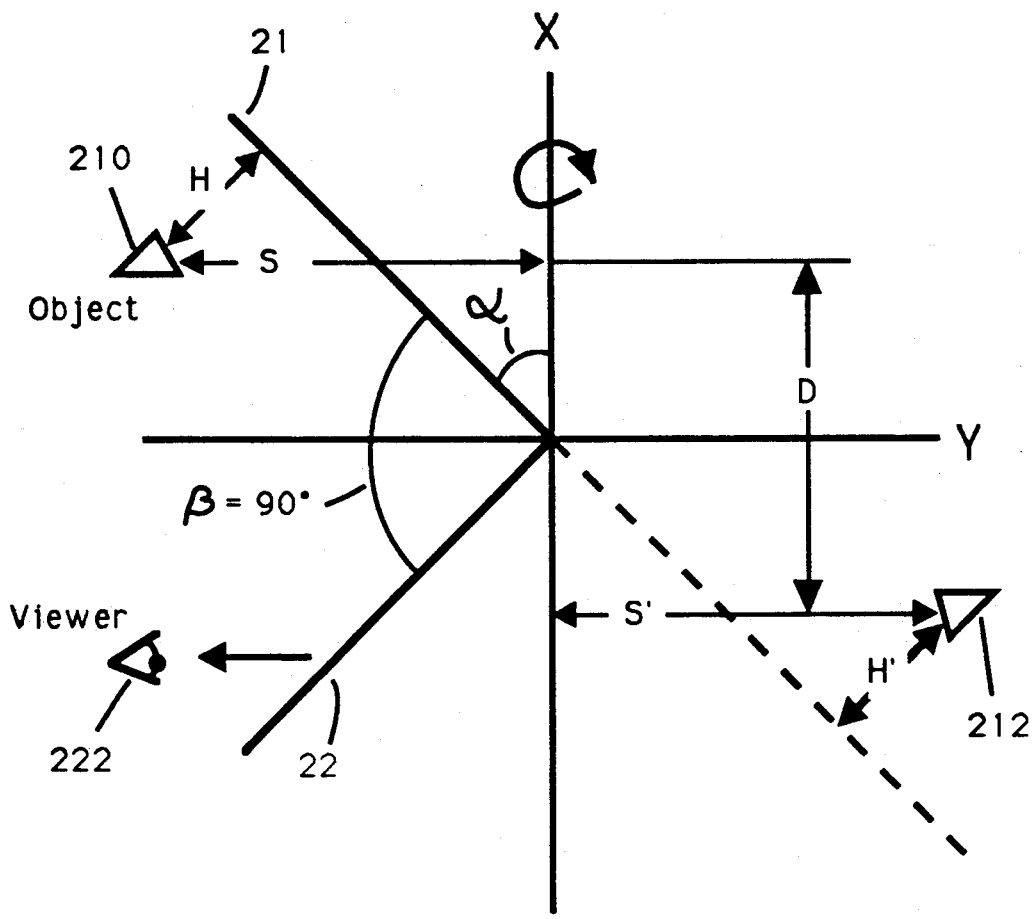
FIG. 7 is a diagram of a mirror system corresponding to FIG. 5 (arbitrary $\alpha$, $\beta = 90$ degrees) observed from another mirror to which the object is aligned.

FIG. 7—Mirrors Mounted At A Right Angle

There is one more situation (illustrated in FIG. 7) where side mirror 21 and opposite-side mirror 22 are separated by an angle $\beta = 90$ degrees. Object 210 produces an image 212. The distance S' of the image from the rotational axis X is equal to distance S of the object from the rotational axis, i.e., S' = S. The object and image are symmetric with respect to rotational axis X of the polygon. H is the distance of each of object 210 and image 212 from symmetry plane 21. S is the distance of each of object 210 and image 212 from rotational axis X. D is the downshift of the image with respect to the object, i.e., the image appears to viewer 222 at a height which is less than its actual height by a value D.

In this situation the image produced by the mirror system is like an image shifted down after it is produced by a vertical mirror mounted directly on the rotational axis. Downshift D does not break symmetry with respect to axis X and it has the advantage of enabling one to view the image from mirror 22 when the object is aligned towards mirror 21. In this situation, the corresponding plane of symmetry illustrated by the broken line and the plane of mirror 21 are the same.

The situation illustrated in FIG. 7 is for:

$n \times 2 \times \beta = 180$ degrees \hfill (2)

where n is an integer (n = 1,2,3,4 ...) and its value for the situation illustrated in FIG. 7 is 1, resulting in $\beta = 90$ degrees (the largest value possible). An important difference between the situations illustrated in FIGS. 6 and 7 is the location of the viewer. In FIG. 6, viewer 224 and object 90 are both aligned towards mirror 21. In FIG. 7 viewer 222 and object 210 are not aligned towards the same mirror. The advantage of the arrangement of FIG. 7 is that the object never blocks the field of view for the viewer along the scan range.

In conclusion, under the conditions expressed by equations (1) or (2) above, off-axis mirrors 21 and 22 in one of the structures shown in FIGS. 5, 6, and 7 behave effectively like a mirror mounted directly on axis X. This effect provides a way to overcome the limitations of standard polygons caused by their off-axis mirrors.

The principle of the mirror systems of FIGS. 5, 6, and 7 is implemented in polygons as follows. Each facet of a regular polygon F15, F16, F17, F18, F19 and F20 (FIG. 4) is replaced by a set of mirrors as shown in FIGS. 5, 6, or 7. This creates a unique structure (FIG. 7), including a plurality of facets, each comprising a tilted side mirror 21, and an opposite-side mirror 22.

There are no special restrictions on angle $\alpha$ in FIGS. 5, 6, and 7, so long as it satisfies the relationships in either equation (1) or (2). The value of depends on the locations of the object and the viewer and it must be in a range that will enable the viewer to watch the desired image.

Figure 8:
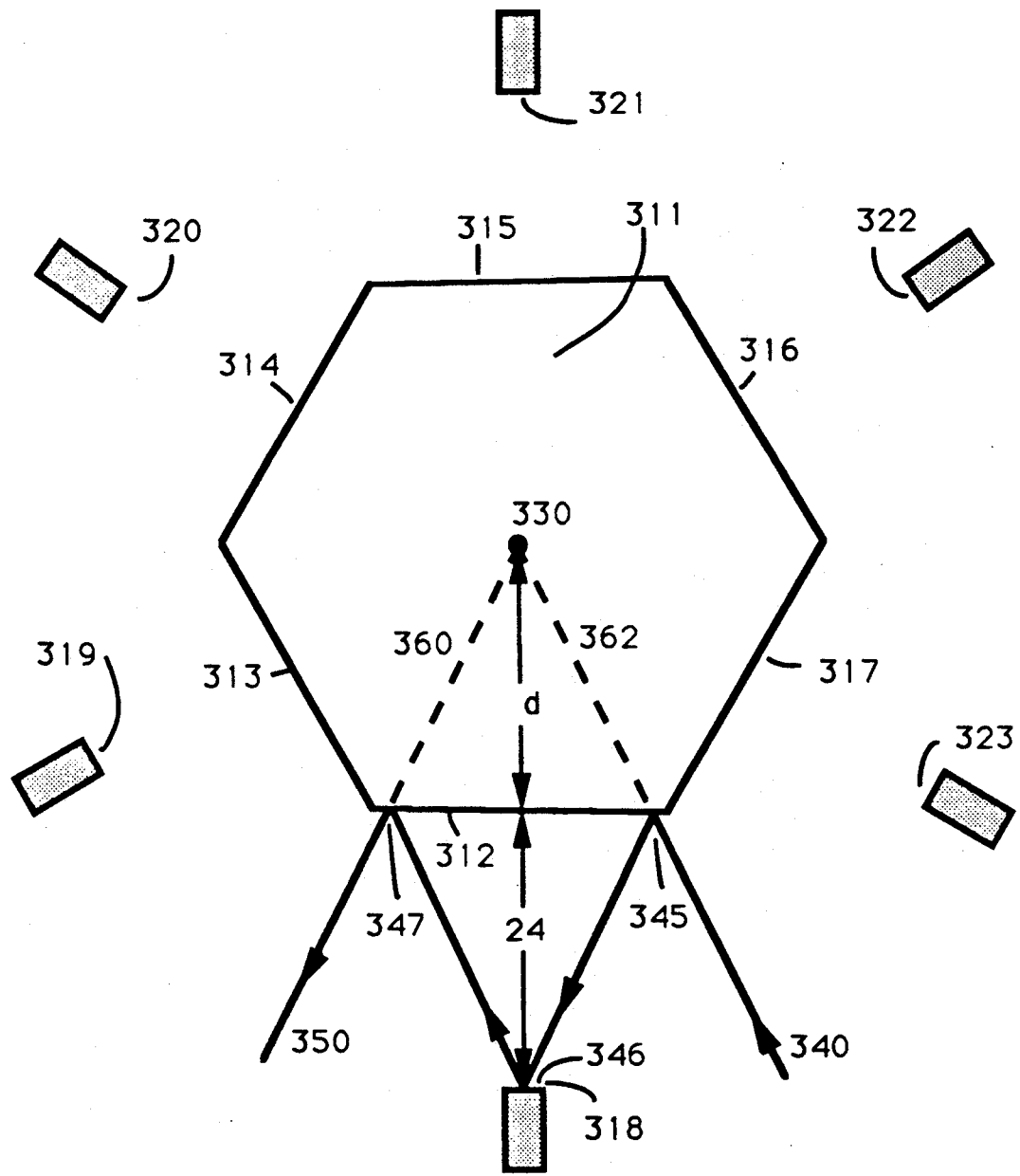
FIG. 8 is a top-view of the cross-section of a polygon produced according to the invention ($\alpha = \beta = 0$ degrees).

FIG. 8—Polygon With Sets Of Parallel Mirrors

A top cross-sectional view of an optical system employing a polygon 311 designed according to the invention is shown in FIG. 8. This is a special case where angle equals zero. We let the value n in equation 1 approach infinity. The planes of side mirrors 21 and opposite-side mirrors 22 (FIG. 6) have a common intersection point at infinity on the polygon's X axis, i.e. they are parallel.

Each of the polygon's faces in FIG. 8 has a parallel opposing mirror, i.e., mirrors 312 to 317 face or have opposing mirrors 318 to 323, respectively. Mirrors 318 to 323 are opposite-side mirrors or secondary mirrors and are physically narrow. Mirrors 312 to 317 are side mirrors and form a conventional polygon. However, the set of side mirrors, together with the set of opposite-side mirrors, defines a unique structure, including polygon 311, according to the invention. The X axis is at center 330 of polygon 311. Opposite side mirrors 318 to 323 are located on radial lines going from center 330 through the centers of side mirrors 312 to 317. The distances between pairs of mirrors 312 and 318; 313 and 319; 314 and 320; 315 and 321; 316 and 322; and 317 and 323 are the same as distance d between center 330 and the center of each of side mirrors 312 to 317.

In other words, the system of FIG. 8 shows a six-sided polygon with six secondary mirrors. Typical dimensions of the entire system are 10 to 100 centimeters in width and 5 to 20 centimeters in height, with proportional sizes for individual components.

When a light beam 340 propagates from a point away from polygon 311 toward center 330 and hits side mirror 312 at point 345 (for example), it is reflected toward point 346 on opposite-side mirror 318. From mirror 318 it is reflected back and hits mirror 312 again at point 347. From point 347 it is reflected out of the scanning system as beam 350.

A simple geometrical analysis shows that the triangle defined by vertices 345, 346 and 347 is congruent to the triangle defined by vertices 345, 330 and 347. Beam 350 appears to propagate along a line 360 originating at center 330 and passing through point 347. This optical path is equivalent to the optical path of a light beam reflected from a mirror located at center 330 whose plane is parallel to mirror 312. The equivalent optical path is illustrated as broken lines 360 and 362 along points 345, 330 and 347.

When a collected or launched beam for the purposes of reading or writing using a line-scan camera or laser is oriented toward the polygon's axis, it is always reflected to the same point on the opposite-side mirror. In that situation the width of opposite-side mirrors 318 to 323 can be as narrow as the width of the picture image of the scan line on the opposite-side mirrors. This width is narrower than the width of the scan line on a product located at the end of line 350. This is because this mirror is between the product (maximum width) and the camera (minimum width). The mirror has a width which is smaller than a millimeter.

This system will have advantages over a prior-art polygon as long as the incident beam is aligned towards the center of the polygon. The movement of reflected tracking beam 350 will be linear and will have a constant optical path.

Figure 9:
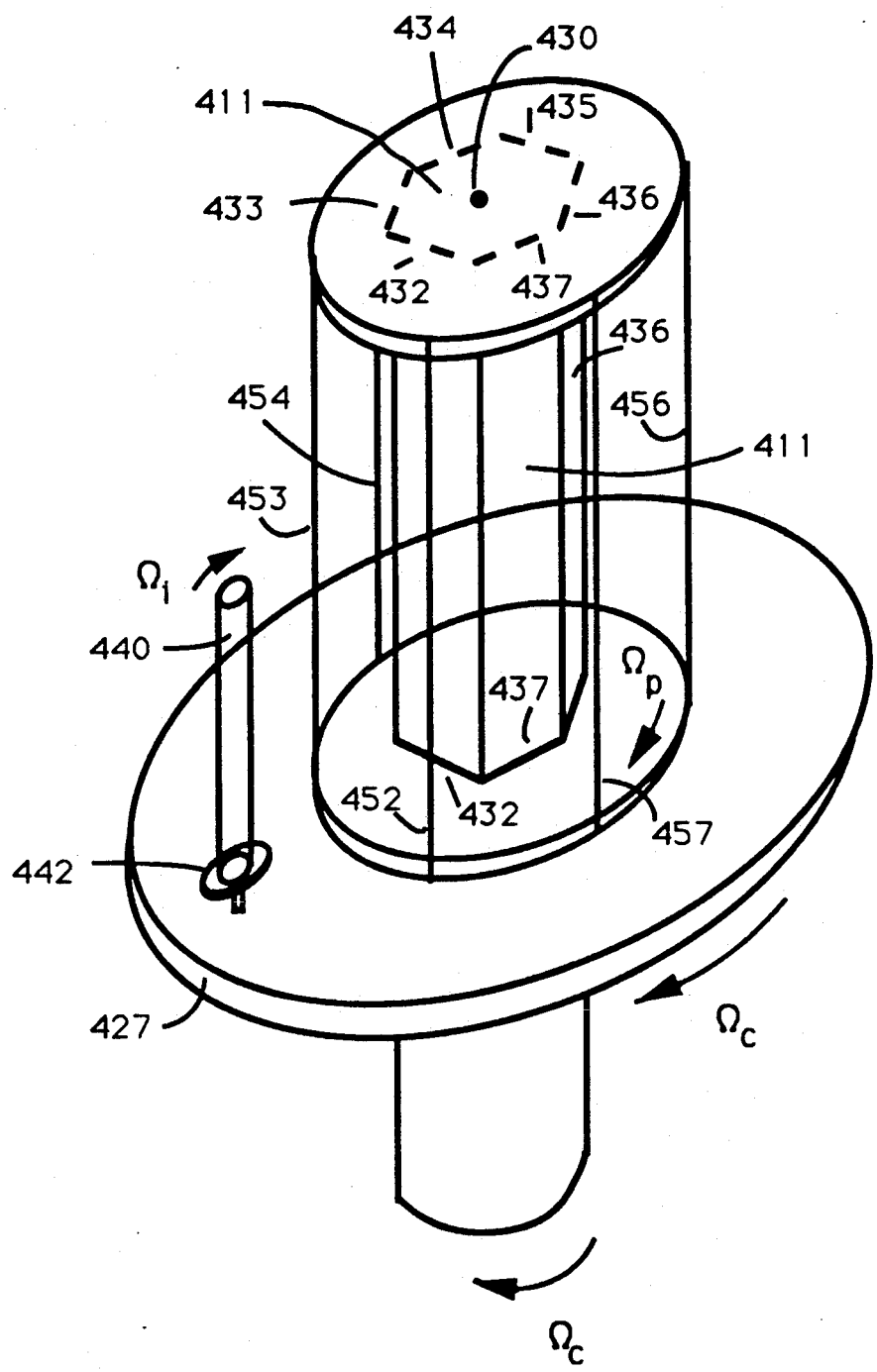
FIG. 9 is a perspective view of a polygon corresponding to FIG. 8 mounted at the center of rotating carousel.

FIG. 9—Tracking System With Parallel Mirrors Faces

FIG. 9 is a perspective view of a practical system employing a six-sided polygon 411 corresponding to the polygon of FIG. 8. Polygon 411 is mounted at the center of a carousel 427. Polygon 411 and carousel 427 rotate around axis 430. Carousel 427 rotates at an angular velocity c and polygon 411 and opposite-side mirrors 452 to 457, described below, rotate at an angular velocity p. The motor and transmission system for driving the system of FIG. 9 is not shown, for purposes of clarity and since it is readily constructed by those skilled in the art.

The relationship between the two angular velocities is given by:

$$\Omega p = \Omega c/2 \tag{3}$$

An object 440, which can be a bottle to be inspected, spins on its own axis with an angular velocity $\Omega_i$ in a socket or bearing 442 mounted on carousel 427. As discussed previously, opposite-side mirrors 452 to 457, corresponding to secondary mirrors 318–323 of FIG. 8, respectively, can be very narrow, provided that a line-scan technique is used and that the beam orientation is towards center 430. In this case opposite-side mirrors 452 to 457 block the field of view between the polygon's mirrors 432 to 437 and the object only once during a scan. Since the opposite-side mirror's widths can be even less than the width of the scan line on the product, they can be made, for example, from very narrow metal strips. The disturbance of such narrow mirrors (caused by blocking the field of view only once along the scan range) is negligible.

An alternative way to scan the whole surface of the object without blocking the view by the side mirrors is to spin the object fast enough to allow it to complete a full turn before reaching the point where the opposite-side mirrors block its view.

This tracking system has advantages over prior-art systems, so long as the incident beam is aligned towards the center of the polygon. This system tracks object 440 in a continuous linear manner. The system's optical behavior is equivalent to a system using a tracking plane mirror at the center of carousel 427, with the advantage of having a continuous, non-oscillating tracking movement which is free of the conventional problems created by pupil shift.

Typically, the entire system of FIG. 9 is 1 to 4 meters wide by 2 meters high, and has an angular velocity $\Omega_c$ of approximately 100 rotations per minute, the individual components being sized proportionally.

FIG. 10—45-Degree Mirrors With Common Opposite Side Mirror

Figure 10:
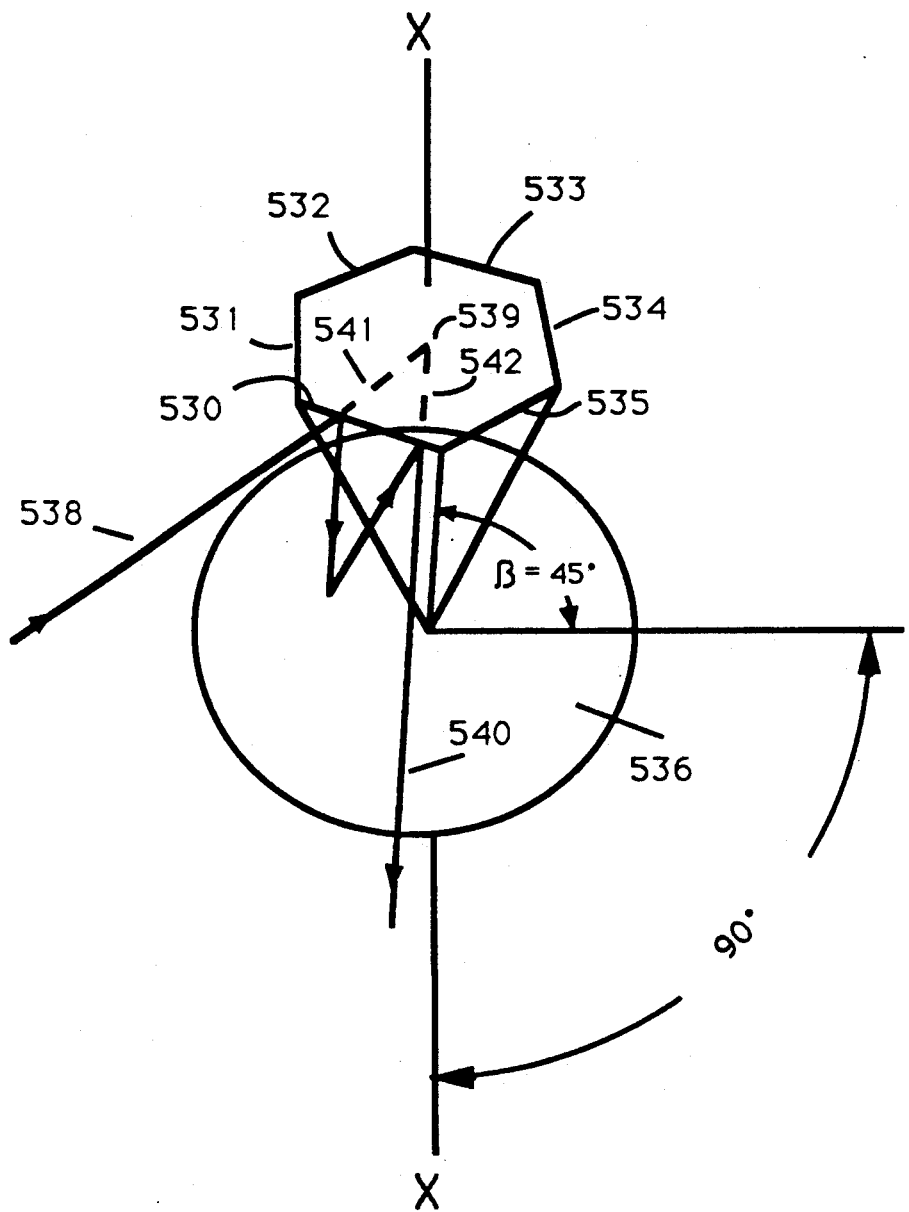
FIG. 10 is a perspective view of a polygon produced according to the invention ($\alpha = \beta = 45$ degrees).

Another polygon structure designed according to the invention is illustrated in perspective in FIG. 10. The polygon has triangular side mirrors 530 to 535 with angles $\alpha = \beta = 45$ degrees ($\alpha$ not shown). These side mirrors are tilted at an angle 45 degrees from the vertical. All of their apices meet at a common point. Instead of a plurality of opposite-side mirrors tilted at an angle of 90 degrees with respect to rotational axis X of the polygon, a single opposite side mirror 536 is provided which forms a floor or base of the carousel. Mirror 536 is in effect a combination of a plurality of opposite-side mirrors which are joined together to have a common plane that is perpendicular to the polygon's axis. The polygon is mounted on the carousel instead of polygon 411 of FIG. 9; mirrors 452 to 457 are removed. The rest of the system's configuration and object positions remain the same.

The optical path of a light beam 538 oriented towards center 537 of the polygon is also illustrated. The incoming and the outgoing beams 538 and 540 coincide with broken lines 541 and 542 that illustrate the optical path of the beam when the polygon is replaced by a vertical mirror mounted directly on axis X.

The structure of FIG. 10 is easier to make than the structures of FIGS. 8 and 9. This structure also has the advantage that its opposite-side mirrors, i.e., its base mirror, does not block the field of view between the polygon and the scanned area. On the other hand, in a situation where the launched beam (in case of writing) or the collected beam (in case of reading) is oriented towards the polygon's axis by a narrow mirror, it blocks the field of view once during tracking.

There is no special requirement that the beam be launched toward the polygon's axis.

Since each side of the polygon behaves effectively like a mirror mounted directly on the polygon's axis, it is possible to launch the beam in different directions. Under these conditions it will not cause the field of view to be blocked at any point during tracking and it will still keep the linear relationship between the rotational angle of the polygon and the position angle of the carousel.

The tracking system of FIG. 10 has an advantage over prior-art systems and also over the system of FIG. 9. This advantage is freedom from the restriction to align the incident beam towards the center of the polygon. In this system, it is possible to launch the beam in different directions, gaining flexibility for the system. The system that uses this polygon will also have the advantage of continuous linear tracking of an object. The system's optical behavior is equivalent to a system using a tracking plane mirror at the center of the carousel, with the advantage of a continuous, non-oscillating tracing motion and freedom from conventional problems created by pupil shift.

Typically the system of FIG. 10 is 10 to 50 centimeters wide and 5 to 20 centimeter high.

Figure 11:
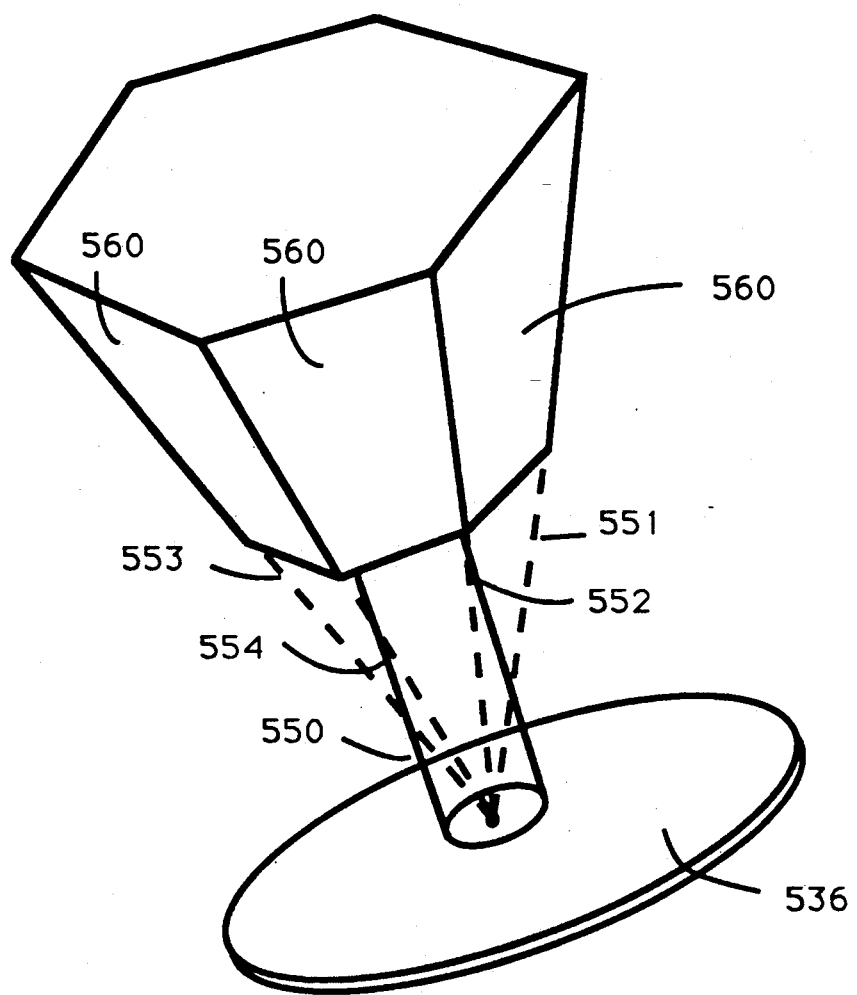
FIG. 11 is a perspective view of a modified version of the polygon illustrated in FIG. 10 for producing a stronger mechanical-structure.

FIG. 11—More Practical 45-Degree Mirror Arrangement

The polygonal structure of FIG. 10 is not strong structurally because the tilted side mirrors are joined to the circular mirror (opposite-side mirror) at only one point, resulting in less mechanical strength. To increase mechanical strength, the lower part of the polygon, shown in broken lines, can be replaced by a strong shaft 550, as illustrated in the perspective view of FIG. 11. Broken lines 5 to 554 in FIG. 11 illustrate the edges of the lower part of the polygon that is replaced by the strong shaft. As a result, each side mirror 560 is trapezoidal. In general the mirrors can be arranged to form only the parts of the polygon that are required for the scanning system.

The polygon is mounted on the carousel instead of polygon 411 in FIG. 9; mirrors 452 to 457 are eliminated. The rest of the system's configuration and the object position remain the same.

This system has the advantage over the one described in FIG. 10 that it is stronger, more practical, and can be built to suit an industrial environment. A tracking system using this polygon will also have the other advantages over the prior art, described in conjunction with FIG. 10.

FIG. 12—Practical Tracking Polygon

A structure that combines the advantages of the polygon of FIG. 11 with the ability to mount the collecting and launching mirror outside the field of view between the polygon and the scanned area is illustrated in perspective in FIG. 12. The operating principle of this structure is analogous to the operating principle of the mirror system of FIG. 7. The structure of FIG. 12 comprises two identical polygonal mirror arrays 600 and 602 which are mounted on a common axis X. Each polygon has trapezoidal faces 604 which are oriented at 45 degrees to axis X and 90 degrees to the respective corresponding opposite faces. I.e., the orientation of side mirrors and the opposite-side mirrors define angles $\alpha=45$ degrees and $\beta=90$ degrees, respectively. $\beta$ satisfies the conditions in equation (2) for $n=1$.

Since the system is completely symmetric with respect to the X and Y axes, there are two ways to use the system. One is to use the mirrors of upper polygon 600 as the side mirrors and the mirrors of lower polygon 602 as the opposite-side mirrors. The alternative is to use the mirrors of lower polygon 602 as the side mirrors and the mirrors of upper polygon 600 as the opposite-side mirrors. The planes of the side mirrors and the opposite-side mirrors intersect at point 606 located on rotational axis X.

The polygon is to be mounted on the carousel instead of polygon 411 of FIG. 9; mirrors 452 to 457 are eliminated. The rest of the system's configuration and object position remain the same.

Typically the entire system of FIG. 12 is 10 to 50 centimeters wide and 50 centimeters high. It has an angular velocity of 100 rotations per minute.

The tracking system using the polygon of FIG. 12 has the advantage, relative to the prior-art, of a continuous linear tracking movement. It is also free of any alignment restriction on the incident beam and has extra mechanical strength.

Figure 13:
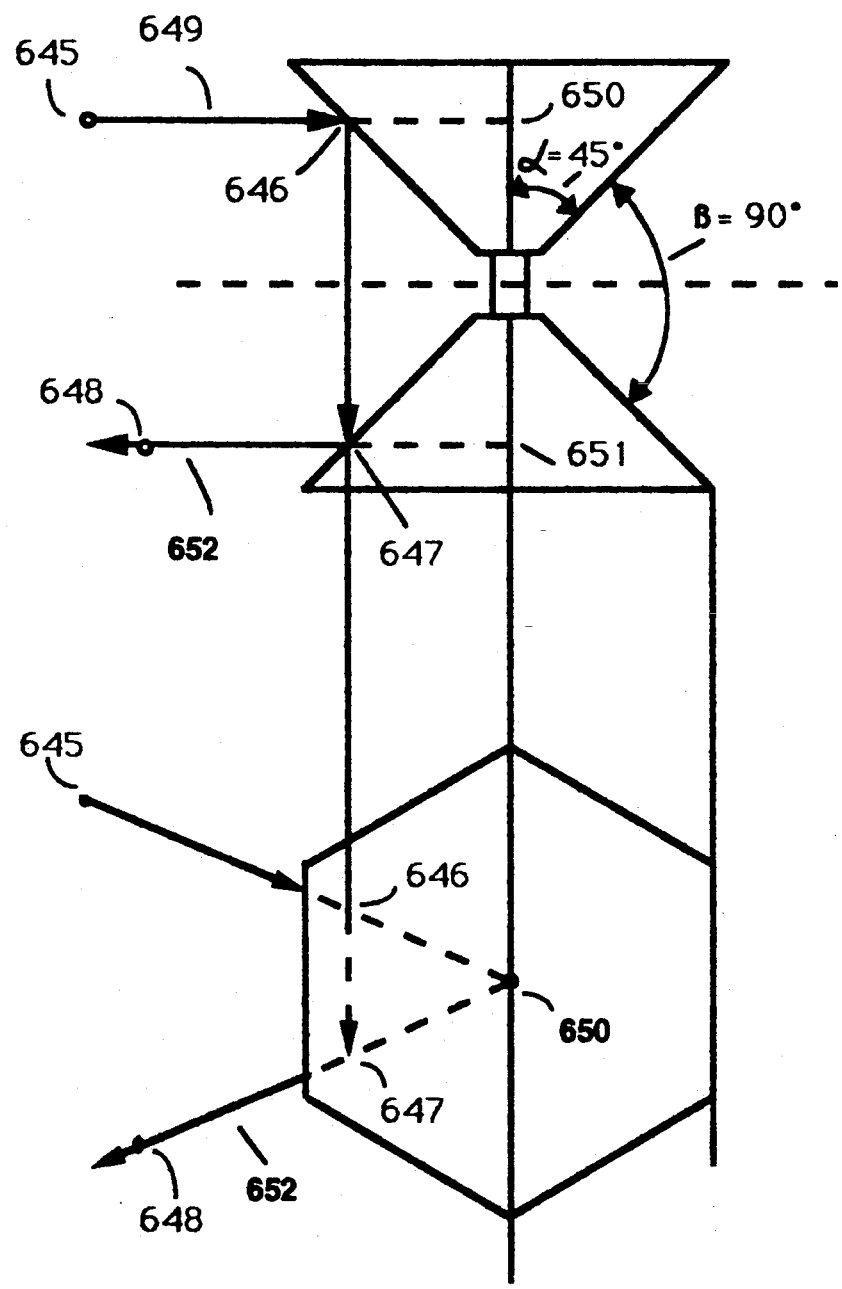
FIG. 13 is a side view projection (upper part) and the top view projection (lower part) of the polygon system corresponding to FIG. 12.

FIG. 13—Optical Path Of Incident Reflected Beam

Projections of the side and top views of the polygon system of FIG. 12, including the optical-path of the beam, are illustrated in the upper and lower parts of FIG. 13, respectively.

The optical path of the beam in the upper part of the drawing is illustrated by solid and dashed lines between points 645, 646, 647, and 648. Incoming beam 649 is aligned towards the upper polygon. Outgoing beam 652 is collected from the lower polygon and produces an upside-down image. The projection lines between points 646 to 650 and 651 to 647 in the upper part of the drawing demonstrate the optical path of a beam reflected from a vertical mirror located in the center. The solid and dashed lines between points 645 to 646, and 647 to 648 in the lower part of the drawing illustrate the optical path of the beam. It can be seen that the top projections of the outgoing beam in the polygonal system at the top of FIG. 13 and in a system where a vertical mirror is at the center at the bottom of FIG. 13 are the same.

Both parts of the drawing show that (I) the image is shifted down and the field of view that contains the image does not contain the object, (II) scanning along the rotational angle is as effective as if it were done by a vertical mirror in the center, i.e., it is insensitive to pupil shift. The downshift of the image provides a place for a large collecting and launching mirror in a location where it will not block the field of view between the polygon and the scanned area, even when the collecting and launching mirrors orient the beam toward the polygon's axis.

The combination of large polygons that are insensitive to pupil-shift (explained in FIG. 4) and large collecting and launching mirrors that do not block the field of view make this polygon system suitable for an accurate scanning system that can track products on rotating carousels without distortion, even when area scanning with matrix cameras or wide-beam laser writing is used.

The reader will thus see that, in accordance with a preferred embodiment of the invention, we have provided a polygon system in which each side behaves effectively like a mirror whose plane contains the rotational axis of the polygon. The polygon is insensitive to pupil shift and other off-axis effects and does not produce a bowed line when it is installed in the center of a carousel for tracking items on the carousel, so long as its rotational velocity is half the rotational velocity of the carousel.

SUMMARY, RAMIFICATIONS, AND SCOPE

While the above description contains many specificities, these should not be construed as limitations on the scope of the invention, but as exemplifications of the presently preferred embodiments thereof. Many other ramifications and variations are possible within the teachings to the invention. For example, the polygon can be produced with a different number of sides, different radii, and different angles according to equations (1) or (2). It also can be used as a mirror system when only parts of the polygon are built. Although the invention has been described using the example of scanning of bottles, it can be used to scan or inspect other objects, such as printed matter, glass, mechanical, electronic, or optical parts. Although the mirrors of the polygon are shown as contiguous the adjacent side mirrors can be spaced apart. Although polygons with six sides have been shown, the polygons can have three to dozens of sides. The exemplary dimensions and rotational speeds given can be changed within wide ranges.

Thus the scope of the invention should be determined by the appended claims and their legal equivalent, and not by the examples given.

We claim:
1. A scanning system comprising:
   a polygon having at least one planar side mirror and an axis of rotation,
   said side mirror defining a plane and facing away from said axis of rotation;
   carousel means rotatable about said axis of rotation of said polygon, said carousel means being arranged to support at least one object in a position spaced from said axis of rotation;
   secondary mirror means comprising at least one secondary mirror, said secondary mirror defining a plane which intersects said plane of said side mirror, thereby defining an intersection line for said side mirror and said secondary mirror, said intersection line intersecting said axis of rotation;
   means for rotating said polygon at a first angular velocity about said axis of rotation;
   means for rotating said carousel at twice said first angular velocity about said axis of rotation; and
   means for directing light from a light source onto said polygon such that light is reflected from said polygon to said secondary mirror means and thence to said at least one object on said carousel means;
   whereby when said polygon is rotated about said axis of rotation, said side mirror and said secondary mirror together behave similarly to a mirror lying in a plane including said axis of rotation.
2. Apparatus according to claim 1 wherein an angle $\beta$ is defined between said side mirror and said secondary mirror and an angle $\alpha$ is defined between said side mirror and said axis of rotation, the value of said angle $\beta$ being an integral number of times the value of said angle $\alpha$.
3. The scanning system of claim 2 wherein said angle $\beta$ is an even integral number of times smaller than 180 degrees.
4. The scanning system of claim 2 wherein said angle $\beta$ is a right angle.
5. The scanning system of claim 2 wherein said angle $\alpha$ is 45 degrees and said angle $\beta$ is also 45 degrees.
6. Apparatus according to claim 1 where said secondary mirror is mounted perpendicular to said axis of rotation.
7. Apparatus according to claim 1 wherein said side mirror has a base side and two further sides which converge at an angle.
8. Apparatus according to claim 1 wherein said side mirror has a trapezoidal shape.
9. Apparatus according to claim 1 wherein said side mirror has a triangular shape.
10. Apparatus according to claim 1 wherein said secondary mirror means comprises a second polygon identical to said first-named polygon, said second polygon being spaced from said first-named polygon and having an axis of rotation coaxial with said first-named polygon.
11. Apparatus according to claim 10 wherein said side mirror is trapezoidal in shape and said secondary mirror means comprises at least one trapezoidal secondary mirror.
12. Apparatus according to claim 1 wherein said polygon has a plurality of side mirrors distributed symmetrically with respect to said axis of rotation; and said secondary mirror means comprises a corresponding plurality of secondary mirrors.
13. A scanning system, comprising:
    a polygon having at least one planar side mirror and an axis of rotation, said side mirror defining a plane and facing away from said axis of rotation;
    carousel means rotatable about said axis of rotation of said polygon, said carousel means being arranged to support at least one object in a position spaced from said axis of rotation;
    secondary mirror means comprising at least one secondary mirror, said secondary mirror defining a plane arranged to intersect the plane of said side mirror, thereby defining an intersection line for said side mirror and said secondary mirror, said intersection line intersecting said axis of rotation;
    means for rotating said polygon at a first angular velocity about said axis of rotation;
    means for rotating said carousel at twice said first angular velocity about said axis of rotation; and
    means for directing light from said one object via said polygon and said secondary mirror means to a light receiver;
    whereby when said polygon is rotated about said axis of rotation, said side mirror and the said secondary mirror together behave similarly to a mirror lying in a plane including said axis of rotation.
14. Apparatus according to claim 13 wherein said side mirror has a base side and two additional sides which converge at an angle.
15. Apparatus according to claim 13 wherein said side mirror has a trapezoidal shape.
16. Apparatus according to claim 13 and wherein said side mirror has a triangular shape.

17. Apparatus according to claim 13 wherein said secondary mirror means comprises a second polygon identical to said first-named polygon, said second polygon being spaced from said first-named polygon and having an axis of rotation coaxial with said first-named polygon.

18. Apparatus according to claim 17 wherein said side mirror is trapezoidal in shape and said secondary mirror means comprises a plurality of trapezoidal secondary mirrors.

19. Apparatus according to claim 13 wherein said polygon has a plurality of side mirrors distributed symmetrically with respect to said axis of rotation and said secondary mirrors means comprises a corresponding plurality of secondary mirrors.

20. Apparatus according to claim 13 wherein an angle $\beta$ is defined between said side mirror and said secondary mirror, and an angle $\alpha$ is defined between said side mirror and said axis of rotation, and wherein said angle $\beta$ is an integral number of times smaller than said angle $\alpha$.

21. Apparatus according to claim 13 wherein an angle $\beta$ is defined between said side mirror and said secondary mirror, and an angle $\alpha$ is defined between said side mirror and said axis of rotation, and wherein said angle $\beta$ is an even integral number of times smaller than 180 degrees.

22. A scanning system, comprising:
a polygon having at least one planar side mirror and an axis of rotation, said side mirror defining a plane parallel to and facing away from said axis of rotation;
carousel means being rotatable about said axis of rotation of said polygon, said carousel means being arranged to support at least one object in a position spaced from said axis of rotation;
secondary mirror means comprising at least one secondary mirror, said secondary mirror defining a plane arranged parallel to said plane of said side mirror;
means for rotating said polygon at a first angular velocity about said axis of rotation;
means for rotating said carousel at twice said first angular velocity about said axis of rotation; and
means for directing light from a light source onto said polygon, such that light is reflected from said polygon to said secondary mirror means and thence to said object on said carousel means,
whereby when said polygon is rotated about said axis of rotation, said side mirror and said secondary mirror together behave similarly to a mirror lying in a plane including said axis of rotation.

23. Apparatus according to claim 22 wherein said polygon has a plurality of side mirrors distributed symmetrically with respect to said axis of rotation; and said secondary mirror comprises a corresponding plurality of secondary mirrors.

24. A scanning system, comprising:
a polygon having at least one planar side mirror and an axis of rotation, said side mirror defining a plane parallel to and facing away from said axis of rotation;
carousel means being rotatable about said axis of rotation of said polygon, said carousel means being arranged to support at least one object in a position spaced from said axis of rotation;
secondary mirror means comprising at least one secondary mirror, said secondary mirror defining a plane arranged parallel to the plane of said side mirror;
means for rotating said polygon at a first angular velocity about said axis of rotation;
means for rotating said carousel at twice said first angular velocity about said axis of rotation; and
means for directing light from said at object via said polygon and said secondary mirror means to a light receiver;
whereby when said polygon is rotated about said axis of rotation, said side mirror and said secondary mirror together behave similarly to a mirror lying in a plane including said axis of rotation.

25. Apparatus according to claim 24 wherein said polygon has a plurality of side mirrors distributed symmetrically with respect to said axis of rotation, and said secondary mirror means comprises a corresponding plurality of secondary mirrors.

* * * * *